(12) United States Patent
Nishimura

(10) Patent No.: US 6,552,308 B2
(45) Date of Patent: Apr. 22, 2003

(54) SUBSTRATE TEMPERATURE ADJUSTMENT APPARATUS FOR ESTIMATING A TIME TAKEN UNTIL A SUBSTRATE TEMPERATURE FALLS WITHIN A TARGET TEMPERATURE RANGE

(75) Inventor: Naosuke Nishimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/945,728

(22) Filed: Sep. 5, 2001

(65) Prior Publication Data

US 2002/0027000 A1 Mar. 7, 2002

(30) Foreign Application Priority Data

Sep. 6, 2000 (JP) ........................................ 2000-270323

(51) Int. Cl.7 ................................................ H05B 1/02
(52) U.S. Cl. ................. 219/497; 219/492; 219/121.43; 118/724; 156/345
(58) Field of Search ................................. 219/494, 492, 219/497, 499, 501, 121.43; 392/416; 118/724, 725; 156/345; 29/25.02

(56) References Cited

U.S. PATENT DOCUMENTS

| 5,350,899 | A | * | 9/1994 | Ishikawa et al. | ............. 219/494 |
| 5,352,248 | A | * | 10/1994 | Ishikawa et al. | ............. 156/626 |
| 5,793,022 | A | * | 8/1998 | Klinck et al. | ................ 219/483 |
| 5,809,211 | A | * | 9/1998 | Anderson et al. | ........... 392/416 |

* cited by examiner

Primary Examiner—Mark Paschall

(57) ABSTRACT

A substrate temperature adjustment apparatus includes a temperature adjustment device for adjusting a temperature of a substrate, and a temperature measurement device for measuring a temperature of the temperature adjustment device, when the temperature is out of a target temperature range. The time taken until the temperature of the substrate falls within the target temperature range is predicted on the basis of the temperature of the temperature adjustment device measured by the temperature measurement device.

12 Claims, 4 Drawing Sheets

SUBSTRATE TEMPERATURE ADJUSTMENT APPARATUS FOR ESTIMATING A TIME TAKEN UNTIL A SUBSTRATE TEMPERATURE FALLS WITHIN A TARGET TEMPERATURE RANGE

FIELD OF THE INVENTION

The present invention relates to a substrate temperature adjustment apparatus in a semiconductor manufacturing system, which performs temperature management for the temperature of a substrate such as a wafer to a certain predetermined value.

BACKGROUND OF THE INVENTION

Generally, in a semiconductor manufacturing system, semiconductors are manufactured by subjecting a substrate such as a wafer to a plurality of processes, and each process for the wafer is performed under temperature management suitable to it. Since temperatures in the respective processes by each of the units differ, the wafer temperature must be managed in each of the units that perform respective processes and during wafer transfer among the units.

In particular, in a semiconductor exposure apparatus, if the wafer has a nonuniform heat profile, a thermal strain occurs in the wafer, and however good the resolution of the projection optical system is, exposure with a desired line width cannot be performed, and a good overlay accuracy cannot be obtained. For these reasons, wafer temperature management must be performed.

According to a conventional wafer temperature adjustment method, a wafer temperature adjustment time is set for the temperature of a wafer to be loaded. The wafer is kept placed on a wafer temperature adjustment plate for a predetermined period of time, thereby performing wafer temperature management.

Also, according to another wafer temperature adjustment method, the temperature of the wafer is actually monitored, and when the wafer temperature has fallen within a certain predetermined range, wafer temperature adjustment is ended, thereby performing wafer temperature management. This reduces a temperature difference produced on the surface of the wafer.

With the method of performing temperature adjustment of a substrate for a certain predetermined period of temperature adjustment time as with the above conventional temperature adjustment means, the wafer temperature may vary. Hence, when a wafer with a temperature lower than the lower limit of the target temperature range of the wafer is loaded, wafer temperature adjustment is performed more than necessary, and the process speed of the entire apparatus is decreased by the time taken by the temperature adjustment. Conversely, when a wafer with a temperature higher than the upper limit of the target temperature range of the wafer is loaded, the wafer temperature adjustment time becomes insufficient, and the wafer which is not sufficiently temperature-adjusted is processed. This leads to poor precision of the apparatus.

With the method of monitoring the wafer temperature and ending wafer temperature adjustment when the wafer temperature has fallen within a certain predetermined temperature range, it is very difficult to monitor the wafer temperature. With a contact type temperature sensor, in a wafer temperature adjustment unit, since the lower surface of the wafer is brought into contact with the plate, or since the gap between the lower surface of the wafer and the plate is managed, it is very difficult to bring the wafer into contact with the temperature sensor. Also, with a non-contact type temperature sensor, it is difficult to obtain a temperature measurement precision necessary for the wafer. When the substrate temperature adjustment apparatus is provided to a wafer thermometer, the overall size of the apparatus itself becomes undesirably large.

SUMMARY OF THE INVENTION

The present invention has been made in view of the above problems, and has as its object to provide a substrate temperature adjustment apparatus for performing substrate temperature adjustment of a substrate, such as a wafer which is being loaded, with an appropriate process time. In other words, it is an object of the present invention to provide a substrate temperature adjustment apparatus for performing temperature control of a substrate to a certain predetermined temperature, in which the temperature of a plate or the like of a temperature adjustment means is measured upon an elapse of a predetermined period of time, and temperature adjustment is performed with a substrate temperature adjustment time determined by the measured temperature of the temperature adjustment means, thereby improving the process speed and temperature adjustment performance.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

As the embodiments of the present invention, with a temperature adjustment plate (temperature adjustment unit) comprised of a heat uniforming layer for performing temperature management of a plate to a certain predetermined temperature, a Peltier element layer, and a heat dissipating layer, when a wafer loaded onto three pins is to be placed on the plate and subjected to temperature adjustment, it is preferable that the temperature of the plate be monitored, the wafer temperature adjustment time be determined from the temperature of the plate obtained upon an elapse of a predetermined period of time, the three pins be moved upward when the temperature adjustment time has elapsed, and the wafer be moved to the unloading position.

A substrate temperature adjustment apparatus according to the present invention may be characterized in that a temperature adjustment unit and temperature measurement unit are provided to an exposure apparatus for exposing the pattern of a master onto a substrate.

[First Embodiment]

An embodiment of the present invention will be described with reference to the accompanying drawings.

Figure 1:
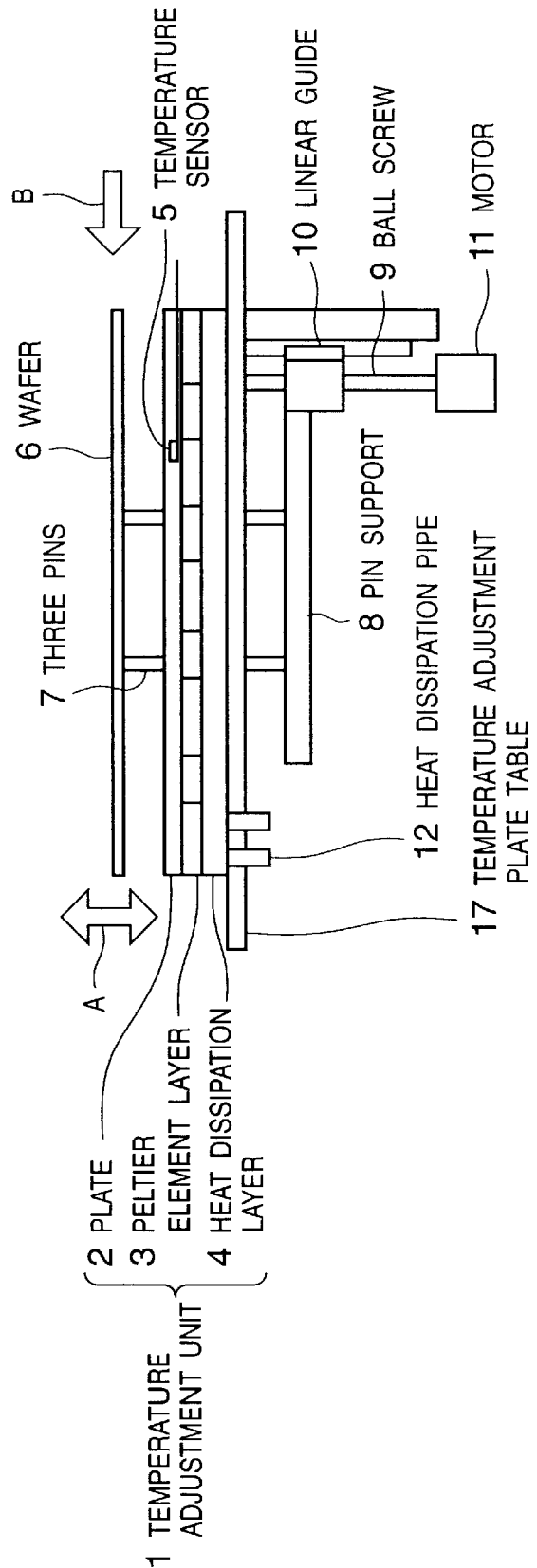
FIG. 1 is a side view showing a substrate temperature adjustment apparatus according to an embodiment of the present invention.

FIG. 1 is a side view showing a substrate temperature adjustment apparatus according to the first embodiment of the present invention.

In this embodiment, as shown in FIG. 1, the substrate temperature adjustment apparatus has a temperature adjustment unit 1. The temperature adjustment unit 1 performs temperature management of a wafer 6 as a substrate to be loaded. The temperature adjustment unit 1 has a three-layered structure, and is comprised of a plate 2 as the upper layer to engage with the wafer 6 to be placed on it, a Peltier element layer 3 as the middle layer, and a heat dissipation layer 4 as the lower layer. The temperature adjustment unit 1 is set on a temperature adjustment plate table 17, and a temperature sensor 5 is buried in the plate 2.

The substrate temperature adjustment apparatus also has three pins 7 extending through the temperature adjustment unit 1, and a pin support 8 located below the temperature adjustment unit 1 to support the three pins 7. A ball screw 9 of the pin support 8 which supports the three pins 7 is rotated by a motor 11 while it is guided by a linear guide 10, so the three pins 7 vertically move as indicated by a double-headed arrow A. The three pins 7 can be positionally adjusted in the vertical direction such that their upper ends can project from and be retracted into the upper surface of the plate 2.

The substrate temperature adjustment apparatus moves the wafer 6, loaded in the direction of an arrow B, downward onto the three pins 7 with a substrate transfer apparatus (not shown) by the vertical driving operation of the three pins 7, such that the upper ends of the three pins 7 are located below the plate 2 of the temperature adjustment unit 1, thereby placing the wafer 6 onto the plate 2 of the temperature adjustment unit 1. When the three pins 7 waiting below the temperature adjustment unit 1 are moved upward, the wafer 6 that has undergone temperature adjustment can be carried to the transfer position of the substrate transfer apparatus described above.

In this embodiment, the three pins 7 are moved downward below the temperature adjustment unit 1 so as to place the wafer 6 on the plate 2 of the temperature adjustment unit 1, and temperature adjustment of the wafer 6 is performed. Alternatively, the three pins 7 may not be moved downward below the temperature adjustment unit 1, but may be driven such that the wafer 6 is held on the temperature adjustment unit 1 with a small gap, and temperature adjustment of the wafer 6 may be performed.

Regarding the temperature adjustment method of the temperature adjustment unit 1, when the temperature adjustment unit 1 does not perform temperature adjustment of the wafer 6, a current to be supplied to the Peltier element layer 3 with the Peltier effect is controlled by, e.g., PID control, so that the output temperature of the temperature sensor 5 becomes a preset value and accordingly the temperature on the plate 2 becomes a predetermined value. The Peltier element layer 3 is formed of a plurality of Peltier elements sparsely arranged between the plate 2 and heat dissipation layer 4 at an interval.

In the temperature adjustment unit 1, the heat dissipation layer 4 is formed on that side of the Peltier element layer 3 which is opposite to a side in contact with the plate 2. Heat discharged downward from the Peltier element layer 3 is discharged outside the temperature adjustment unit 1 by a fluid running through a heat dissipation pipe 12 built in the heat dissipation layer 4. In the temperature adjustment unit 1, when the plurality of Peltier elements constituting the Peltier element layer 3 are sparsely arranged at an interval, a heat profile becomes nonuniform, so the plate 2 is arranged on the Peltier element layer 3 to make the heat profile uniform. Hence, the temperature adjustment unit 1 can control the upper surface of the plate 2 to a predetermined uniform temperature by controlling the current to be supplied to the Peltier element layer 3.

The temperature adjustment unit 1 performs temperature adjustment of the wafer 6 in the following manner.

The wafer 6 loaded onto the three pins 7 by the substrate transfer apparatus (not shown) is placed on the plate 2 of the temperature adjustment unit 1 by moving the three pins 7 downward. At this time, the wafer 6 may be brought into surface contact with the plate 2. Alternatively, small pins may be arranged on the plate 2, so a small gap is formed between the wafer 6 and plate 2. Alternatively, proximity balls may be formed on the plate 2 to support the wafer 6, so a small gap is formed between the wafer 6 and plate 2.

As the wafer 6 is placed on the plate 2, a heat quantity Q of the wafer 6 is gradually transferred to the plate 2 to increase its temperature. As the temperature of the plate 2 increases, the temperature of the temperature sensor 5 buried in the plate 2 increases. The current to be supplied to the Peltier element layer 3 is PID-controlled so that the temperature of the temperature sensor 5 becomes constant with respect to the temperature increase of the temperature sensor 5. As a result, the Peltier element layer 3 deprives the plate 2 of the heat, so the temperature of the wafer 6 together with the plate 2 converges to a target temperature.

Figure 2:
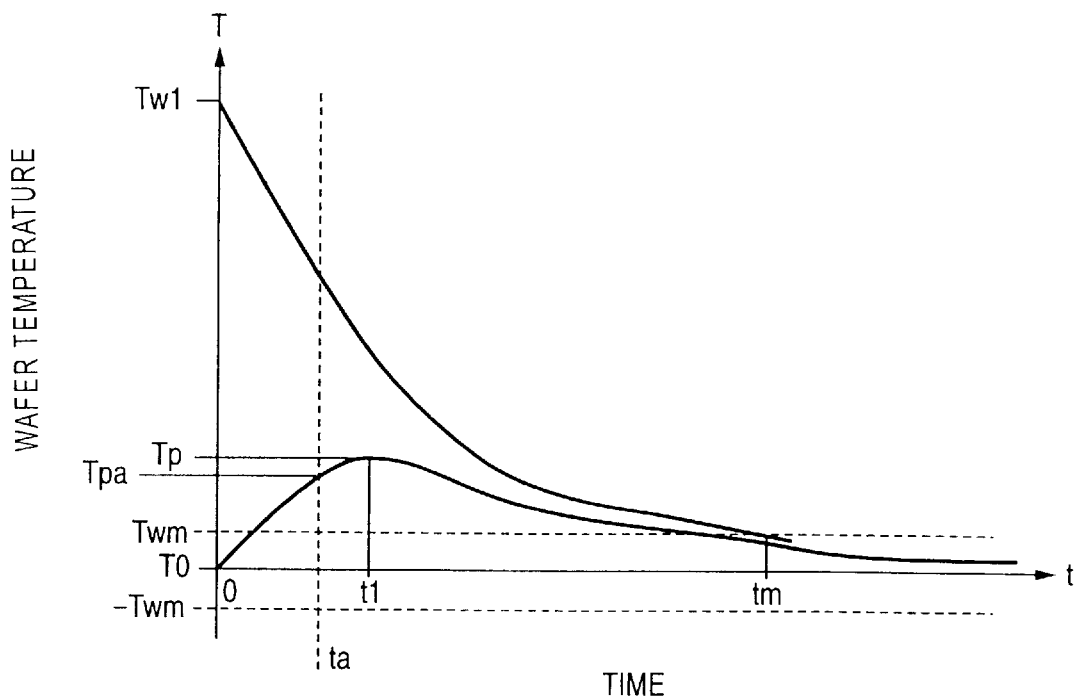
FIG. 2 is a graph showing the temperature changes of a wafer and plate that occur when the wafer with a temperature of Tw1 degrees adjusted by the substrate temperature adjustment apparatus according to the embodiment of the present invention is placed on the plate.

The temperature changes of the wafer 6 and plate 2 at this time are as shown by the graph of FIG. 2. In this graph, the axis of abscissa represents time, and the axis of ordinate represents temperature. On the axis of the abscissa, a point where t=0 is the moment when the wafer 6 is placed on the plate 2 of the temperature adjustment unit 1. On the axis of the ordinate, T0 is the target temperature of the wafer and the initial temperature at the moment when the wafer 6 is placed on the plate 2. Tw1 is the temperature of the wafer 6 which has been loaded. After the wafer 6 is placed on the plate 2, heat of the wafer 6 is gradually transferred to the plate 2. Upon an elapse of t sec satisfying t=t1, the temperature of the plate 2 increases to a maximum temperature Tp, and after that the temperatures of the plate 2 and wafer 6 decrease gradually. If the wafer 6 is left on the plate 2 for a time period longer than an elapsed time of t sec satisfying t=tm taken until the temperature of the wafer 6 falls within a target temperature range of T0±Twm degrees, temperature adjustment of the wafer 6 can be ended.

This temperature change of the plate 2 is uniquely determined by the initial temperature Tw1 of the wafer 6, the initial temperature T0 of the plate 2, heat transfer between the wafer 6 and plate 2, heat absorption by the Peltier element layer 3 from the lower surface of the plate 2, and the like. More specifically, when a temperature Tpa of the plate 2 obtained upon an elapse of ta sec since the wafer 6 is placed on the plate 2 can be estimated uniquely, and the temperature Tw1 of the wafer 6 can be estimated from the graph showing the temperature change of the plate 2, so that the time tm taken until the temperature of the wafer 6 falls within the target temperature range of T0±Twm degrees can be determined.

Figure 3:
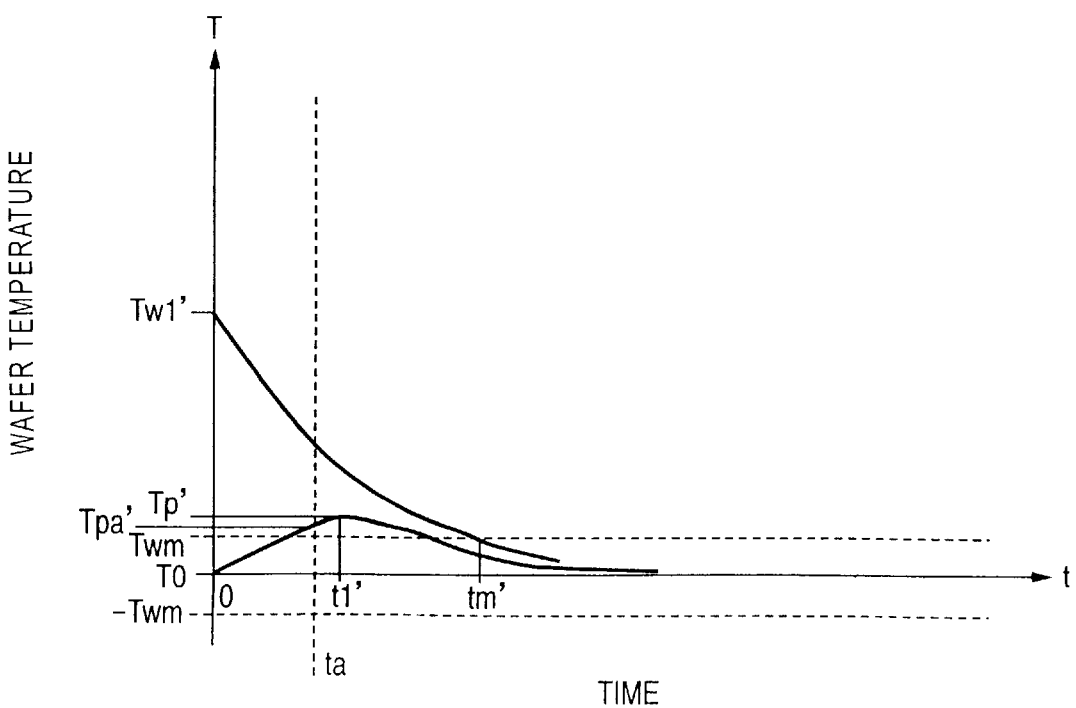
FIG. 3 is a graph showing the temperature changes of a wafer and plate that occur when the wafer with a temperature of Tw1' degrees is placed on the plate of the substrate temperature adjustment apparatus according to the embodiment of the present invention.

The temperature changes of the wafer 6 and plate 2 that occur when the wafer 6 with a temperature Tw1' (<Tw1) is placed on the plate 2 are as shown in FIG. 3. The same as that when the temperature of the wafer 6 is Tw1 applies to this case. When the set time t of the wafer 6 satisfies t=0, the wafer temperature is Tw1' and the plate temperature is T0. After the wafer 6 is placed on the plate 2, heat of the wafer 6 is gradually transferred to the plate 2. Upon an elapse of t sec satisfying t=t1', the temperature of the plate 2 increases to a maximum temperature Tp'. After that, the temperatures of the plate 2 and wafer 6 gradually decrease. The time taken until the temperature of the wafer 6 falls within a target temperature range of T0±Twm degrees is shorter than that taken when the temperature of the wafer 6 is Tw1 degrees. Upon an elapse of t sec satisfying t=tm', the temperature of the wafer 6 falls within the target temperature range of T0±Twm degrees.

This temperature change of the plate 2 is determined by the initial temperature of the wafer 6, the initial temperature of the plate 2, heat transfer between the wafer 6 and plate 2, heat absorption by the Peltier element layer 3 from the lower surface of the plate 2, and the like, in the same manner as that described above. For this reason, when a temperature Tpa' of the plate 2 obtained ta sec after the wafer 6 is placed on the plate 2 is measured, the temperature change of the plate 2 can be estimated uniquely. The temperature Tw1' of the wafer 6 can be estimated from the graph showing the temperature change of the plate 2, so that the time tm' taken until the temperature of the wafer 6 falls within the target temperature range of T0±Twm degrees can be determined. This applies to a case wherein the temperature Tw1 of the wafer 6 is lower than the initial temperature T0 of the plate 2. The temperature adjustment time of the wafer 6 can be uniquely determined by measuring the temperature of the plate 2 ta sec after the wafer 6 is placed on the plate 2.

In this manner, when the temperature of the plate 2 obtained a predetermined period of time after the wafer 6 is placed on the plate 2 is measured, the temperature of the wafer 6 can be estimated. Therefore, the optimal temperature adjustment time of the wafer 6 can be determined for each wafer, so that the processing efficiency of the wafers 6 can be increased to the maximum and temperature adjustment of the wafer 6 can be performed reliably.

In this embodiment, a cooling method in accordance with the Peltier scheme is proposed. Alternatively, another method may be employed with which heat of the wafer 6 is transferred to the plate 2 through surface contact or pin contact of the plate 2 and wafer 6, by gap management with proximity balls, or by moving the plate 2 and wafer 6 close to each other at a small gap, thereby performing temperature adjustment of the wafer 6 together with the plate 2. For example, this method is achieved by supplying cooling water in the plate 2.

According to this method, a plate controlling temperature sensor is used as the temperature sensor 5. Alternatively, a dedicated temperature sensor may be provided separately from the plate controlling temperature sensor. When a dedicated temperature sensor is provided to a thermal non-sensitive zone in the plate 2, the temperature change of the plate 2 can be measured over a wider range, and accordingly, temperature adjustment of the wafer 6 can be performed more accurately.

[Second Embodiment]

Figure 4:
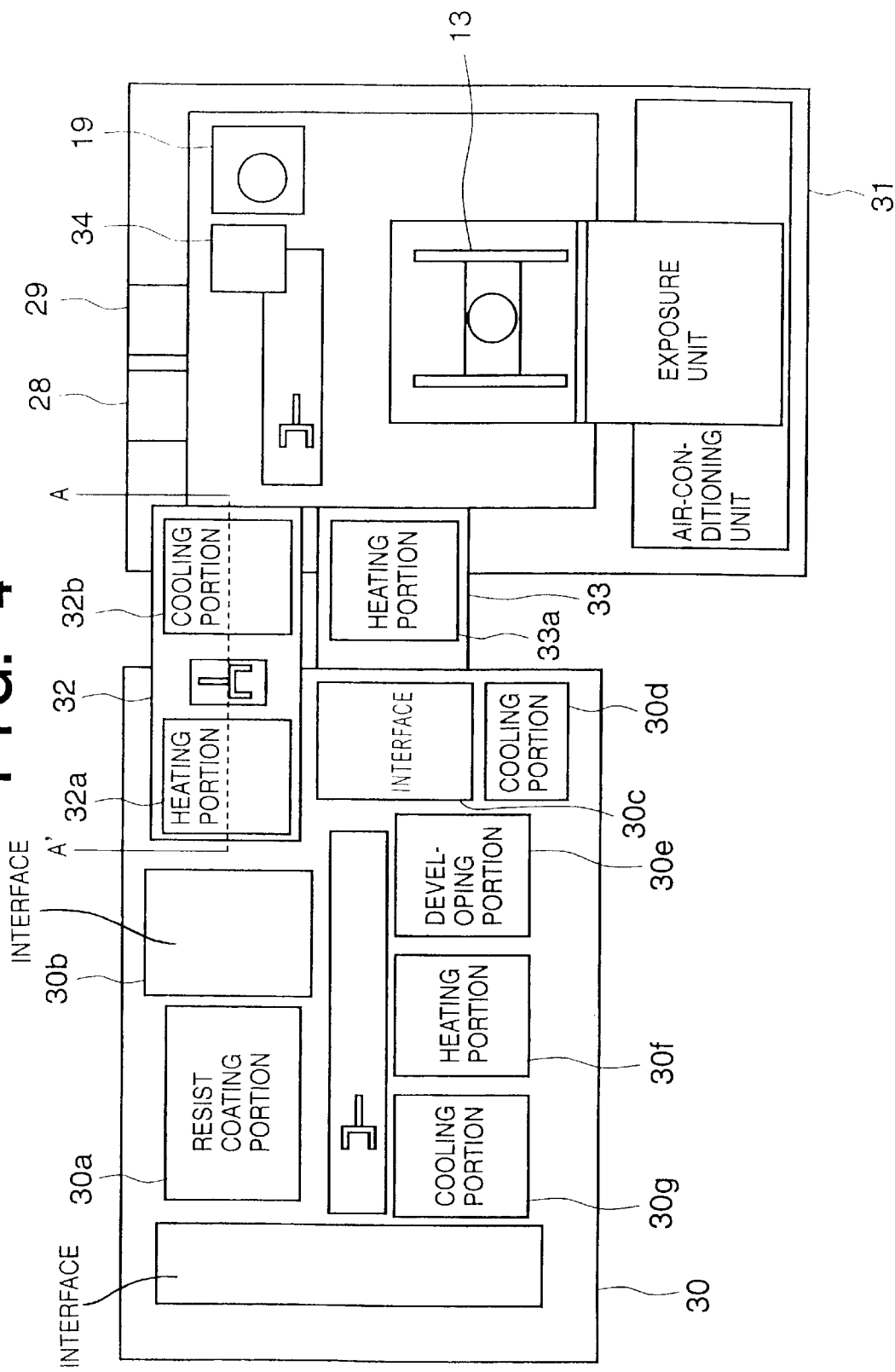
FIG. 4 is a schematic diagram showing a semiconductor manufacturing system as the second embodiment that uses an exposure apparatus to which the substrate temperature adjustment apparatus according to the present invention is provided.

FIG. 4 is a schematic diagram showing a semiconductor manufacturing system as the second embodiment that uses an exposure apparatus to which the substrate temperature adjustment apparatus according to the present invention is provided.

Referring to FIG. 4, reference numeral 13 denotes a wafer stage for mounting a wafer thereon and driving it in the X, Y, Z, θ, and tilt directions; and 19, a prealignment unit for prealigning the wafer.

Reference numeral 30 denotes a coating/developing apparatus (to be referred to as CDS hereinafter) with a coater for applying a resist to the wafer and a developer for developing the wafer after exposure; and 31, an exposure apparatus. The exposure apparatus 31 exposes the pattern of a master (not shown) onto the wafer.

Reference numerals 32 and 33 denote inline ports (32 and 33 denote the first and second ports, respectively); and 28 and 29, manual loading/unloading ports. Each port has a load-lock mechanism. For example, the load-lock mechanism has a mechanism for disconnecting the inner space of the port from the outside when a wafer is to be loaded in the exposure apparatus or when a wafer in the exposure apparatus is to be unloaded, and for setting the atmosphere in the port to a state almost the same as the inner atmosphere of the exposure apparatus.

In this case, when the wafer is to be transferred, doors are closed in order to disconnect the inner space of the port from the outer space, and the inner atmosphere of the port disconnected from the outside is set to the same state as the inner atmosphere of the exposure apparatus. After that, a door between the port and exposure apparatus is opened, and the wafer is transferred.

Each port has a disconnecting mechanism (e.g., a door) as its load-lock mechanism for disconnecting the inner space of the port from the outside, an exhaust mechanism (e.g., a pump) for exhausting the inner gas of the port, and a supply mechanism for supplying a gas similar to the inner atmosphere of the exposure apparatus to the port. For this reason, the inline ports 32 and 33 have doors between them and interfaces 30b and 30c, doors between them and the exposure apparatus 31, exhaust pumps for discharging gases in them and $N_2$ gas supply mechanisms for supplying a gas identical to the inner atmosphere of the exposure apparatus 31 into them.

The manual loading/unloading ports 28 and 29 have doors between them and the outside, doors between them and the exposure apparatus 31, exhaust pumps for discharging gases in them, and $N_2$ gas supply mechanisms for supplying a gas identical to the inner atmosphere of the exposure apparatus 31 into them. The prealignment unit 19 prealigns a wafer with a predetermined temperature in order to prevent defective measurement caused by expansion and shrinkage of the wafer. Reference numeral 34 denotes a substrate temperature adjustment apparatus according to the present invention, which adjusts the wafer to the predetermined temperature before prealignment.

In this embodiment, the first inline port 32 for transferring the wafer from the CDS 30 to the exposure apparatus 31 has a heating portion (heater) 32a and cooling portion (cooler) 32b that serve as a wafer temperature controlling mechanism. The second inline port 33 for transferring the wafer from the exposure apparatus 31 to CDS 30 has a wafer heating portion 33a. Therefore, the CDS 30 has a resist coating portion 30a, the interfaces 30b and 30c, a cooling portion 30d and developing portion 30e after high-temperature heating (post exposure base; to be referred to as PEB hereinafter), and a heating portion 30f and cooling portion 30g after development.

Since the heating portion and cooling portion for prebake and the cooling portion for PEB are provided to each of the first and second inline ports 32 and 33, they are not needed in the CDS 30. In this embodiment, since the cooling portion 32b completes temperature adjustment, the substrate temperature adjustment apparatus 34 only has a function of fine-adjusting the wafer temperature.

In this embodiment, if PEB is performed in a completely dry atmosphere, the resolution performance of the resist is sometimes adversely affected. Hence, in order to control the environmental atmosphere during PEB and not to degrade the atmosphere in the housing of the exposure apparatus 31 during wafer transfer, the heating portion 33a that performs PEB preferably has a humidity adjusting function.

The inner structure of the first inline port 32 of this embodiment will be described in detail with reference to FIG. 5.

Figure 5:
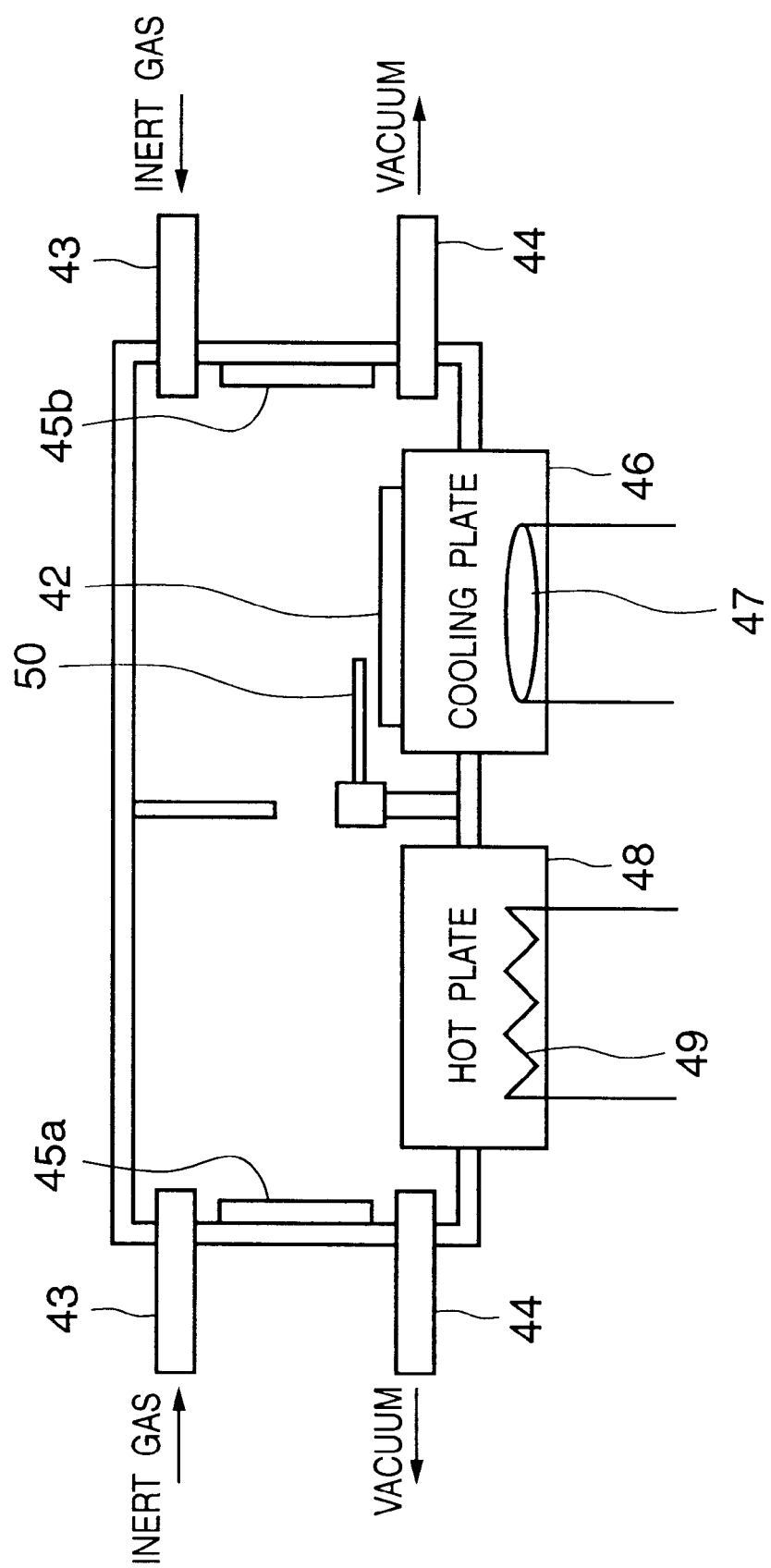
FIG. 5 is a schematic sectional view of the inline port of FIG. 4 taken along the line AA'.

FIG. 5 is a schematic sectional view of the inline port 32 of FIG. 4 taken along the line AA'.

Referring to FIG. 5, reference numeral 42 denotes a wafer to be transferred; 43, a supply pipe for supplying $N_2$ as an inert gas to the first inline port 32; 44, an exhaust pipe for setting the interior of the first inline port 32 to vacuum or to a reduced-pressure atmosphere; 45a, a door formed on the CDS 30 side of the first inline port 32; and 45b, a door formed on the exposure apparatus 31 side of the first inline port 32, respectively. When the doors 45a and 45b are closed, the first inline port 32 is hermetically closed. Reference numeral 46 denotes a cooling plate for cooling the wafer 42; 47, a Peltier element; 48, a hot plate for heating the wafer 42; 49, a heater; and 50, a wafer hand for transferring the wafer 42 in the inline port 32, respectively.

According to the manufacturing system of this embodiment, when the wafer 42 coated with the resist at the resist coating portion is to be loaded from the interface 30b to the exposure apparatus 31, the exposure apparatus 31 side door 45b of the first inline port 32 is closed. When the wafer 42 is loaded on the hot plate 48, the CDS 30 side door 45a of the first inline port 32 is also closed. Subsequently, the interior of the inline port 32 is pressure-reduced to a vacuum atmosphere by air intake with an exhaust pump through the exhaust pipe 44. While the interior of the first inline port 32 is being pressure-reduced, the heater 49 heats the hot plate 48, thereby prebaking the wafer 42. When prebake of the wafer 42 is ended, the wafer hand 50 moves the wafer 42 onto the cooling plate 46.

The Peltier element 47 cools the wafer 42 on the cooling plate 46. When the inner atmosphere of the first inline port 32 becomes a desired vacuum atmosphere, the supply pipe 43 supplies $N_2$ gas to set the inner atmosphere of the first inline port 32 to the same $N_2$ atmosphere as that in the exposure apparatus 31. When cooling of the wafer 42 is completed and the interior of the inline port 32 reaches a predetermined $N_2$ atmosphere, the exposure apparatus 31 side door 45b of the first inline port 32 is opened, and the wafer 42 is carried to the substrate temperature adjustment apparatus 34 by the transfer hand of the exposure apparatus 31.

The wafer 42 transferred to the substrate temperature adjustment apparatus 34 undergoes fine temperature adjustment, and is prealigned at the prealignment unit 19. When alignment and exposure of the wafer 42 are ended, the wafer 42 is transferred to the second inline port 33, and subjected to PEB by the heating portion 33a in the second inline port 33.

The second inline port 33 has a door (not shown) provided to the exposure apparatus side in order to hermetically close the second inline port 33, and a door provided to the CDS 30 side, in almost the same manner as in the first inline port 32.

The interior of the second inline port 33 must be pressure-reduced and purged before the wafer 42 is loaded there.

Once the wafer 42 is loaded from the exposure apparatus 31 to the second inline port 33, a wait time as long as that necessary in the first inline port 32 is not taken until the wafer is transferred to the interface 30c. Therefore, the second inline port 33 does not have a cooling portion but has only the heating portion 33a.

The arrangement of the present invention is not limited to that described above. For example, the interface 30b may have a load-lock mechanism. The heating portion 32a and cooling portion 32b of the first inline port 32 may be separated. In this embodiment, the second inline port 33 has only the heating portion 33a. Alternatively, the second inline port 33 may have a cooling portion 30d.

In the above description, while the heating portion 32a of the first inline port 32 heats the wafer, the inner atmosphere of the first inline port 32 is exhausted. While the cooling portion 32b cools the wafer, $N_2$ is supplied to set the interior of the first inline port 32 close to the inner atmosphere of the exposure apparatus 31. However, the present invention is not limited to this. For example, if it takes time to heat the wafer or to supply the $N_2$, after the first inline port 32 is exhausted, $N_2$ may be supplied to it during heating of the wafer.

Similarly, if it takes time to cool the wafer or to exhaust the first inline port 32, the first inline port 32 may be continuously exhausted during cooling the wafer. In either case, exhaust of the inner atmosphere of the first inline port 32 has desirably been started at least before heating of the wafer is ended, and cooling of the wafer has desirably been ended at least before the exposure apparatus side door of the first inline port 32 is opened (i.e., before gas supply to the first inline port 32 is ended).

According to this embodiment, the process speed and temperature adjustment performance can be improved, and degradation of the atmosphere in the exposure apparatus when a wafer is to be loaded in or unloaded from the exposure apparatus can be prevented.

According to this embodiment, after the wafer is coated with the resist, the atmosphere where the wafer is to be set is controlled at an earlier stage than in the conventional case. Hence, degradation in image performance resulting from degradation of the resist can be reduced.

According to the present invention, since the exposed wafer is subjected to PEB at an atmosphere-controlled place, degradation in image performance resulting from degradation of the resist can be reduced.

As has been described above, according to the present invention, the temperature of a plate or the like of a temperature adjusting means is measured a predetermined period of time after a substrate such as a wafer is placed on the plate, and the temperature adjustment time is determined by this temperature. Even if the substrate temperature varies, temperature adjustment of the substrate can be efficiently and reliably performed, so that the processing ability of the entire system can be improved. When a temperature-adjusted substrate is used, the substrate can be processed with a higher precision. Since a substrate temperature monitor can be omitted, the substrate temperature adjustment unit can be downsized.

As many apparently widely different embodiments of the present invention can be made without departing from the spirit and scope thereof, it is to be understood that the invention is not limited to the specific embodiments thereof except as defined in the appended claims.

What is claimed is:

1. A substrate temperature adjustment apparatus comprising:

temperature adjustment means for adjusting a temperature of a substrate; and temperature measurement means for measuring a temperature of said temperature adjustment means, when the temperature is out of a target temperature range, wherein a time taken until the temperature of the substrate falls within the target temperature range is predicted on the basis of the temperature of said temperature adjustment means measured by said temperature measurement means.

2. The apparatus according to claim 1, wherein an initial temperature of the substrate is determined on the basis of the temperature of said temperature adjustment means measured by said temperature measurement means.

3. The apparatus of claim 1, wherein said temperature measurement means measures the temperature of said temperature adjustment means after a predetermined time has elapsed after the substrate is placed on said temperature adjustment means.

4. The apparatus according to claim 1, wherein said temperature adjustment means lowers the temperature of the substrate.

5. The apparatus according to claim 1, wherein said temperature adjustment means includes a plate on which the substrate is placed, wherein said temperature adjustment means adjusts the temperature of the substrate with a gap between the substrate and the plate.

6. The apparatus according to claim 1, wherein said temperature adjustment means includes a plate on which the substrate is placed, a Peltier element layer formed of a plurality of Peltier elements and a heat dissipating layer for discharging heat transmitted by the Peltier element layer, wherein said temperature adjustment means adjusts the temperature of the substrate by controlling a current value for supplying the Peltier element layer.

7. The apparatus according to claim 6, wherein said Peltier element layer is formed of a plurality of Peltier elements arranged at an interval.

8. An exposure apparatus for exposing a substrate, said apparatus comprising:

an exposure unit for exposing the substrate; and a substrate temperature adjustment unit, wherein said substrate temperature adjustment unit includes (i) temperature measurement means for adjusting a temperature of the substrate; and (ii) temperature measurement means for measuring a temperature of said temperature adjustment means, when the temperature is out of a target temperature range, wherein a time taken until the temperature of the substrate falls within the target temperature range is predicted on the basis of the temperature of said temperature adjustment means measured by said temperature measurement means.

9. A resist coating apparatus, comprising:

a resist coating unit for applying a resist to a substrate; and a substrate temperature adjustment unit, wherein said substrate temperature adjustment unit includes (i) temperature adjustment means for adjusting a temperature of a substrate and (ii) temperature measurement means for measuring a temperature of said temperature adjustment means, when the temperature is out of a target temperature range, wherein a time taken until the temperature of the substrate falls within the target temperature range is predicted on the basis of the temperature of said temperature adjustment means measured by said temperature measurement means.

10. A loading/unloading apparatus for loading/unloading a substrate between a resist coating apparatus and an exposure apparatus, said loading/unloading apparatus comprising:

a transfer unit for transferring the substrate between the resist coating apparatus and the exposure apparatus; and a substrate temperature adjustment unit, wherein said substrate temperature adjustment unit includes (i) temperature adjustment means for adjusting a temperature of a substrate, and (ii) temperature measurement means for measuring a temperature of said temperature adjustment means, when the temperature is out of a target temperature range, wherein a time taken until the temperature of the substrate falls within the target temperature range is predicted on the basis of the temperature of said temperature adjustment means measured by said temperature measurement means.

11. The apparatus according to claim 10, further comprising a load-lock mechanism.

12. A device manufacturing method comprising:

an application step of applying a resist to a substrate;

an exposure step of exposing the substrate by an exposure apparatus having a substrate temperature adjustment unit, wherein the substrate temperature adjustment unit includes (i) temperature adjustment means for adjusting a temperature of a substrate, and (ii) temperature measurement means for measuring a temperature of the temperature adjustment means, when the temperature is out of a target temperature range, wherein a time taken until the temperature of the substrate falls within the target temperature range is predicted on the basis of the temperature of the temperature adjustment means measured by the temperature measurement means; and a step of developing the substrate that has been exposed.

* * * * *

UNITED STATES PATENT AND TRADEMARK OFFICE
CERTIFICATE OF CORRECTION

PATENT NO. : 6,552,308 B2
DATED : April 22, 2003
INVENTOR(S) : Naosuke Nishimura It is certified that error appears in the above-identified patent and that said Letters Patent is hereby corrected as shown below:

<u>Title page,</u>
Insert Item:
-- [74] *Attorney, Agent, or Firm* -
Fitzpatrick, Cella, Harper & Scinto --.

<u>Column 3,</u>
Line 29, "so" should read -- so that --.

<u>Column 4,</u>
Lines 8, 21 and 24, "so" should read -- so that --.

<u>Column 5,</u>
Line 40, "wafers" should read -- wafer --.

Signed and Sealed this

Tenth Day of August, 2004

JON W. DUDAS
*Acting Director of the United States Patent and Trademark Office*